United States Patent [19]

Sawyer

[11] 4,006,557
[45] Feb. 8, 1977

[54] SPROUTING DEVICE
[76] Inventor: George M. Sawyer, 3435 W. 110th St., Inglewood, Calif. 90303
[22] Filed: June 30, 1975
[21] Appl. No.: 591,656

Related U.S. Application Data
[63] Continuation of Ser. No. 380,457, July 18, 1973, abandoned.
[52] U.S. Cl. .................... 47/61; 47/14; 141/319; 141/364; 210/469; 210/474; 210/476; 215/308
[51] Int. Cl.² ............... A01G 31/02; B01D 23/00
[58] Field of Search ............... 141/364, 319, 106; 215/308, 231; 47/DIG. 9, 14, 1.2, 38; 210/469, 474, 476; 220/4 B

[56] References Cited
UNITED STATES PATENTS

| | | | |
|---|---|---|---|
| 1,038,353 | 9/1912 | Hagg | 210/476 X |
| 1,487,231 | 3/1924 | George | 47/38 UX |
| 2,431,063 | 11/1947 | McGahey | 47/14 |
| 2,773,521 | 12/1956 | Persson | 141/364 X |
| 2,927,394 | 3/1960 | Johnson | 220/4 B X |
| 3,040,897 | 6/1962 | Holman | 215/231 X |
| 3,248,016 | 4/1966 | Dahl et al. | 141/319 X |
| 3,788,483 | 1/1974 | Conway | 210/469 X |

OTHER PUBLICATIONS
"How to Sprout Soybeans" p. 63 Dec. 1943 Ladies Home Journal.

Primary Examiner—Edgar S. Burr
Assistant Examiner—Steven A. Bratlie
Attorney, Agent, or Firm—William W. Haefliger

[57] ABSTRACT

The invention relates generally to the art of hydroponic germinating of seeds for their sprouts. The device comprises a frusto-conical transparent jar, a cooperating screen member and a cooperating water receptacle. The jar and screen member are positioned on and above the water receptacle.

4 Claims, 17 Drawing Figures

U.S. Patent  Feb. 8, 1977  4,006,557
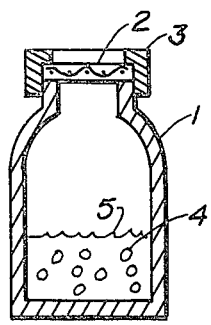
FIG.1A
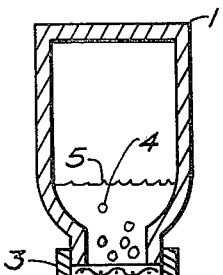
FIG.1B
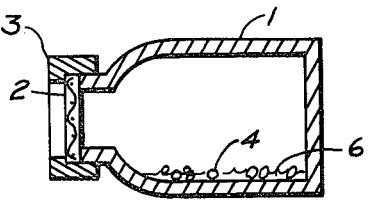
FIG.1C
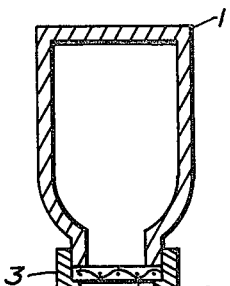
FIG.1D
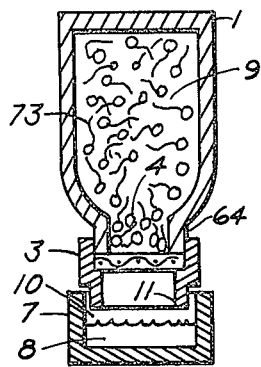
FIG.1E
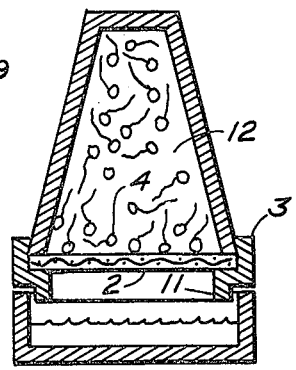
FIG.1F
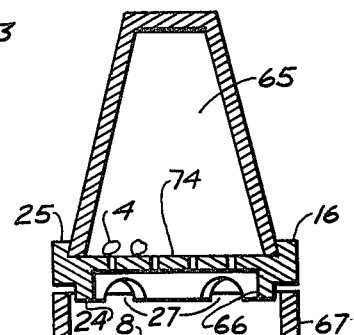
FIG.2A
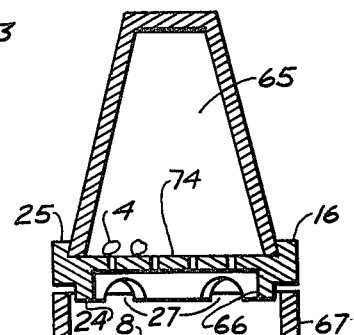
FIG.2B
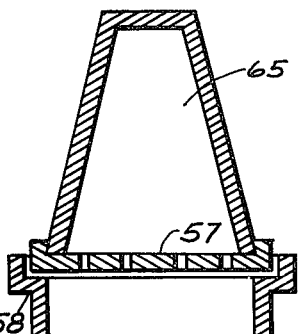
FIG.2C
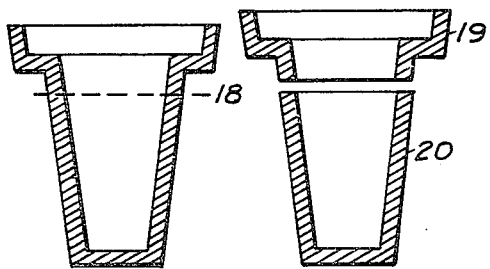
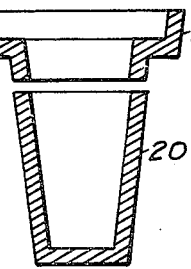
FIG.3A
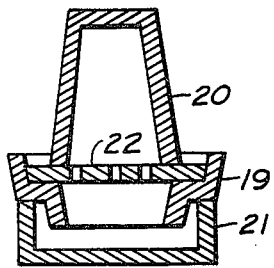
FIG.3B FIG.3C
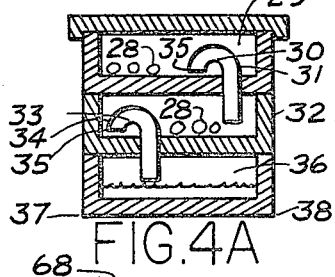
FIG.4A
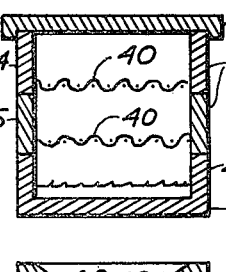
FIG.4B
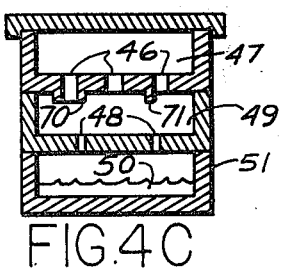
FIG.4C
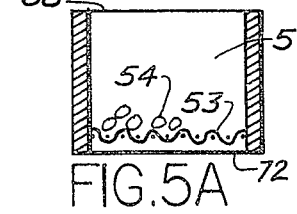
FIG.5A
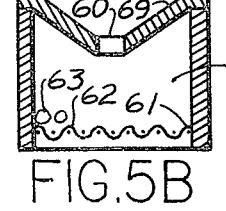
FIG.5B

SPROUTING DEVICE

This is a continuation of application Ser. No. 380,457, filed July 18, 1973, now abandoned.

This invention relates generally to the art of making bean sprouts by using water and no growing medium, as soil, and is specifically directed to improved sprouting devices. One aspect of the invention can be attached to an ordinary mason jar making a low cost bean sprouter that does not retain drip water in a pool.

Heretofore, in growing bean sprouts, it has been a practice to grow them in a mason jar. A disadvantage of this device is the difficulty in removing the bean sprouts; another disadvantage is that a puddle of water naturally forms, and the beans immersed in this puddle will not sprout. Another practice in growing bean sprouts is to use a multi-cavity sprouter where a certain amount of water is added to the top layer; the water is then syphoned down to the next layer, and from here into the next layer, etc. A disadvantage of this device is that it is required to be placed on a flat surface or else a puddle will be formed, and again beans in this puddle will not sprout. Another disadvantage is that if too little water is added, it is insufficient to start the syphon and a puddle will be formed. Hence, this device requires attention to detail.

The main object of the invention is to overcome the aforementioned disadvantages of the multi-layer bean sprouter and of the mason jar bean sprouter by providing a system which removes the possibility of puddles forming. A further object of the invention is to produce a simple and inexpensive device and yet one which will be exceedingly effective for the purpose for which it is designed. These objects, and others, are accomplished by means of such structure and relative arrangement of parts as will fully appear by a perusal of the following specifications and claims:

In the drawing, similar characters of reference indicate corresponding function of the parts in the several views. All figures are elevation views and are in section.

FIG. 1. The Mason Jar, Invertable, One Opening Sprouter.

FIG. 2. An Improved, Invertable, One Opening Sprouter.

FIG. 3. Low Cost, Invertable, One Opening Sprouter.

FIG. 4. Multi-Sprouting Cavity, Non Invertable, Two Opening Sprouter.

FIG. 5. Single Sprouting Cavity, Non Invertable, Two Opening Sprouter.

In the FIGS. 1, 2, and 3, the sprouters have only one opening. Water enters this opening, and after wetting the beans, leaves this same opening. Because there is only one opening present, the sprouter is oriented in one position to conveniently admit water for wetting the beans and is oriented in another position to conveniently pour off excess water from the beans. Because the sprouter is commonly inverted in its normal operation without spilling the beans, the sprouters depicted in FIGS. 1, 2 and 3, are described as "invertable, one opening".

In FIGS. 4 and 5, the sprouters have two openings. Water for wetting the beans enters the upper opening, and water, after wetting the beans, leaves through the bottom opening. Either the upper opening or the lower opening may be a multiplicity of holes. The water thus enters one opening and leaves the sprouter through another opening. Because of the two openings, the sprouter is oriented in only one position for admitting water and for allowing water to drain from the beans. Because it is not necessary to invert the sprouter in its normal operation, the sprouters depicted in FIGS. 4 and 5 are described as, "non invertable, two openings".

Referring now to the mason jar sprouter depicted in FIG. 1, FIG. 1A is the jar in the position to be loaded with beans and water. FIG. 1B is the jar in the position for pouring off the excess water. FIG. 1C is the jar in the position for growing the sprouts. Referring now more particularly to the characters of reference on the drawing, the numeral 1 indicates the mason jar. A screen 2 is held in place by the rim 3. The beans are immersed in water as shown in FIG. 1A, and the water 5 drained from the beans 4 in FIG. 1B. The beans 4 are prevented from leaving the jar 1 by the screen 2 held in place by the rim 3. FIGS. 1A and 1B depict the "bean wetting" phase and FIG. 1C depicts the "bean growing" phase. The bean wetting phase may require a few seconds of time; the bean growing phase may require 4 hours. Part of the water adheres to the beans and slowly trickles down to the lowest part of the sprouter forming a pool 6; beans immersed in this pool will not sprout. In order to remove this pool, the jar 1 may be placed in the position of FIG. 1D. The residual water trickling off the beans will not now form a pool, in which the beans will be immersed, but will flow out of the jar 1 through the screen. In order to bring about the ability of the sprouter to be placed anywhere in the home without wetting items it touches, a "drip catcher" 7 is used in combination with the jar 1, as shown in FIG. 1E, which collects the drippings 8. A "two cavity" bean sprouter results. One of the cavities 9 is within the jar 1 and the other cavity is the volume 10 within the drip catcher 7. In order to prevent the jar from accidentally slipping off the drip catcher 7, a positioning or indexing protuberance 11 is added to rim 3 attached to the jar 1.

After four to six days, the jar 1 is full of a tangled mass of sprouts 73 and they are difficult to remove because the jar cavity 9 becomes narrow at the opening 64. By selecting a specially shaped interior 12 that is tapered, FIG. 1F, the bean sprouts 4 are readily removed when the rim 3 and the screen 2 are removed.

In selecting a suitable screen mesh (FIG. 1 numeral 2), consideration is given to the size of the seeds that might commonly be used in the sprouter. Besides mung beans, alfalfa seeds are commonly used and 20 mesh (20 threads per inch) is close enough to prevent most of the alfalfa seeds from passing through it. Plastic screen is commonly used but plastic screen with this fine mesh is too flexible to be self-supporting. Common practice has been to glue the screen 13 into the rim 14 permanently by adhesive 15 as shown in FIG. 2A. This glueing operation is tedious and the time required adds to the ultimate cost to the consumer. A "free standing" material has been discovered which is stiff enough to be self-supporting. This material is twenty mesh Type 304 stainless steel wire cloth produced as a standard product by Cambridge Wire Cloth Company of Cambridge, Maryland 21613. The wire diameter is .016; thicker wire would make it even stiffer, but adds unnecessarily to the cost.

Another method of creating a surface which performs the same function as the screen does is a barrier-with-holes 74, in FIG. 2B. Also, a molded article can be made in one piece that performs the function of the barrier-with-holes 74 over the end of the sprouting cavity 65, fastening this surface 74 to the sprouting cavity 65, and providing a positioning ring or protuberance 66. This article may be made of common polyethylene by injection molding, to provide a "least cost" sprouter. FIG. 2B shows this combination ring 16. This combination ring 16 may be attached to the bean sprouting cavity 65 by a variety of methods to include a snap on, press on, or screw on method. Also shown in FIG. 2B are the beans 4, with water catcher 67 and drip water 8.

Another way of positioning the sprouting cavity 65 with respect to the water catcher 67 is shown in FIG. 2C. The sprouting cavity 65 is separated from the water catcher 67 by a barrier-with-holes 57. The combination sprouting cavity 65 and barrier-with-holes 57 is positioned on the water catcher 56 by means of a ledge 58.

One of the parts of the sprouter depicted in FIG. 2B may be eliminated, thus reducing costs. By referring to the ring 16 in FIG. 2B, it is seen that it has an upper part 25, which connects to the sprouting cavity 65, and a lower protuberance 66 which positions the ring 16 on the drip catcher 67. The trace of the lower extremity 24 of the protuberance 66 would ordinarily be flat. After the seeds have been wetted, the combination sprouting cavity 65, barrier-with holes 74, and ring 16 with protuberance 66 may be placed on the drain board of the sink instead of on top of the drip catcher 67 as shown in FIG. 2B. Because the lower edge 24 of the protuberance 66 is flat, it will not allow the drippings 8 to escape from the sprouting cavity 65 because the initial puddle that forms, when it is placed on a flat surface, seals the rim 24 and prevents the entry of air to replace the water that would desirably flow from the sprouting cavity 65. In order to facilitate the removal of water and the entry of air, cut outs 27 are made in the protuberance 66. Effective drainage results. Combination ring 16 may be attached to an ordinary mason jar making a low cost sprouter.

A method of making a low cost screen-retaining ring is shown in FIG. 3A (a conventional sixteen ounce plastic polystyrene container as number 30916 supplied by Amoco Packaging Products Division, Amoco Chemicals Corp., 14250 Gannet Street, La Mirada, California, 90638). Here, a cut 18 is made separating the container into two pieces resulting in a ring 19 and a cup 20 as shown in FIG. 3B. A sprouter is then made (as shown in FIG. 3C) by obtaining a water catcher 21 (as number 30906 also supplied by said Amoco), placing the ring 19 on top of the water catcher 21, placing a barrier-with-holes 22 in the ring 19, and by placing the cup 20 (but inverted) on top of the ring 19. This sprouter is used by inverting the combination cup 20, barrier-with-holes 22 and ring 19. Water is then added, thus wetting the beans, and the combination is inverted and placed on top of the water catcher 21 as shown in FIG. 3C. The water catcher is emptied as required. The beans may be thus wetted every 4 hours.

Another sprouter in common usage is a multi cavity sprouter as shown in FIG. 4A. An advantage of this type sprouter is that it is only necessary to pour water into the upper cavity 29 and the device automatically wets the lower cavity 32. Beans 28 are placed in the trays (cavities) and water is poured into the upper cavity 29. When the water level is deep enough to exceed the level of the peak 30 of the syphon 31, water drains from the upper cavity 29 into the cavity below 32. When the water level is deep enough to exceed the level of the peak 33 of the second syphon 34, the syphon starts to work and will drain water from the second cavity 32 until the level drops to the level of the intake of the syphon 35. The water collects in the lowest cavity 36. A manufacturer of this device states "An air lock can sometimes prevent the free flow of water and a gentle tap or shake can free this".

A disadvantage of this type of sprouter is that there is just one time when the cavity is drained when the syphon works; water that later trickles down has no way of escaping and thus forms a puddle in which seeds may be immersed.

Another disadvantage of this sprouter is that the user is required to observe particular instructions. The sprouter is required to be placed on a level surface; the drain board of a household sink does not meet this requirement. A manufacturer of this sprouter states "It is essential that the water drains from each seed bowl as otherwise the seeds will not germinate". Furthermore, so that a puddle will not form at the end of the cavity opposite the syphon, the manufacturer states, "Ensure that (this device) always stands on a level surface". A level surface is required because there is just one opening acting as a drain for each sprouting cavity, and that opening is the entrance to the syphon. If the surface upon which the device is placed is not level, so that one side 37 is lower than the other side 38, a puddle of water will form at the lower side 37 and will immerse the seeds during the growing phase and these seeds will not sprout. Another disadvantage of this sprouter is that a somewhat precise amount of water must be measured and poured into the upper cavity 29 in order to prime the syphon. If an insufficient amount of water is added, the water will stand in the upper cavity 29 and immerse the seeds so that the seeds will not sprout, and in the process leave the beans in the lower cavities dry.

These disadvantages can be overcome, as shown in FIG. 4B, by placing a multiplicity of holes 40 over the bottom of each of the many cavities, such as would be provided by mechanically rigid stainless steel screen. Now, the stack of trays 41 may be lifted off the drip catcher 42, the lid 43 removed, and the stack 41 held under the water faucet. Water will drench the seeds in the uppermost cavity 44 and pass, in a relatively unobstructed way, over the seeds in the lower cavities 45. After the stack is removed from the drenching stream of water, and most of the water allowed to drain off, the stack 41 is placed on the drip catcher 42. In order to retain the advantage of the sprouter shown in FIG. 4A, where it is only necessary to cover the seeds in the uppermost layer with water and then the wetting of the lower cavities takes care of itself, but not retain the disadvantage of the requirement that the device must be placed on a level surface, the bottom of each sprouting cavity may be covered with a multiplicity of holes but the number of holes and the size of the holes adjusted so that the flow rate through the bottom of any one cavity is much slower than the flow rate through the bottom of the cavity immediately above it. This improved sprouter is shown in FIG. 4C. The holes 46 in the bottom of cavity 47 are larger than the holes 48 in the bottom of the cavity below 49. The water 50 is finally collected in the drip catcher 51. As an example of the flow rates that might be used, it might take five seconds to add enough water to the top cavity 47 to momentarily immerse the seeds in the top cavity, take fifty seconds for the bulk of the water to drain through the holes 46, and take five hundred seconds to drain through the holes 48. What happens is that the beans in the uppermost cavity are covered with water initially.

The water than drains out of the top cavity 47 into the next cavity 49 faster than the holes 48 in the bottom allow the water to leave so that the cavity 49 is filled with water to the approximate depth of water as was the cavity above. Because holes are distributed at intervals all around the circumference of the bottom of each cavity, water will drain out through at least one of the holes even when the sprouter is placed on a non level surface. Hence, the requirement that the sprouter must be placed on a level surface is obviated by this improvement. Note: The uppermost cavity 47 may not be filled with beans and this cavity may be used as a receiving container into which water is poured, and which distributes water appropriately over the beans below as determined by the holes 46.

There is a disadvantage to a flat surface acting as a barrier-with-holes. When the lower surface of the barrier-with-holes is flat, and when water drips through these holes slowly, the water in flattened droplets collects on the underside of the flat surface and may travel sideways, clinging to the undersurface and drop off at a location not directly beneath the hole opening. This is particularly true when the sprouter is on a non-level surface. This results in water dropping onto the beans beneath in a pattern not determined by the location of the holes above. Thus, some beans may become wetted adequately and some may not. In order to overcome this disadvantage, the holes may have protuberances placed in close proximity to each of the holes. The protuberances may be a circular shoulder 70 or a post 71. The water, as it leaves the opening clings to this protuberance, and stays there becoming bigger as it accumulates more water coming out of the nearby hole, and finally drops off. Thus the drip pattern is now determined by the hole locations.

FIG. 5A is shown for illustrative purposes only and depicts a common form of bean sprouter used in the commercial growing of sprouts which may be eventually sold as produce in the markets. FIG. 5A is explained as a sprouting cavity 52 with a barrier-with-holes 53 with beans 54 inside. Water is admitted into the top 68, momentarily wetting the beans 54. The excess water drains out the bottom 72. The wetting process requires only a few seconds, the time interval between wettings may be four hours. After this cycle is repeated for from four to six days, the beans are removed from the top. This device is placed in a dark humid room. Hence, no cover is required.

FIG. 5B shows another non-invertable, 2 opening sprouter. The sprouting cavity 59 has a large opening 61 below a smaller opening 60; the openings are on opposite ends of the sprouting cavity. A barrier-with-holes 62 (as a screen) is placed across the lower opening. The upper opening 60 is part of a depression 69 with holes in the bottom acting as a funnel. This design offers a considerable amount of darkness, yet the beans 63 are quite accessable to wetting through the upper opening 60 and at the same time the inconvenient steps of removing and replacing a lid are not required.

The term "barrier-with-holes" has been frequently used. This term means a barrier to prevent beans or sprouted beans from passing through it. This barrier may be a screen or may be a solid sheet with one or more holes in it. The word "beans" has been used frequently for illustrative purposes only and the work "beans" means any seed or seed like things, as bulbs. The term "growing medium" is used to eliminate confusion with sprouting devices where a growing medium is used like soil or peat moss.

From the foregoing description it will be readily seen that improvements have been produced that substantially fulfill the objects of the invention as set forth herein.

While this specification sets forth in detail the present and preferred construction of the devices, the examples are illustrative only and in practice such deviations from such detail may be resorted to as do not form a departure from the spirit of the invention, as defined in the claims.

Having thus described the invention, what I claim as new and useful and desire to secure by Letters Patent is:

1. A seed sprouting device comprising
   a. an inverted transparent jar having a bottom neck forming an opening, the jar containing water and seeds prior to being inverted, said neck having a bottom level,
   b. a screen across said opening, and the seeds retained in the jar above the screen, the jar having a frusto-conical side wall which tapers upwardly and inwardly above the level of the screen, the seeds being sprouted and the sprouts extending as a mass within the jar,
   c. an annular body receiving said screen below the bottom level of said neck and projecting horizontally and annularly below said neck, the body defining and extending about an interior, and
   d. a receptacle removably supporting said body and extending therebelow, the receptacle defining and extending about an interior, the receptacle and body interfitting annularly to close said interior of the receptacle from the exterior,
   e. whereby water in the jar may drain downwardly through said neck opening, said screen and said annular body into said receptacle, while said seeds in the jar are retained above the screen,
   f. the body having a depending flange which forms an air inlet to communicate between the exterior and said interior of the body, said flange relieved upwardly from the lower edge thereof to form said inlet, confined at said lower edge,
   g. said screen being circular and located in the body,
   h. said body defining annular step shoulders one of which seats the jar neck and the other of which seats on the receptacle, said screen being at the level of one of said step shoulders,
   i. said jar neck, said receptacle and said body adjacent the neck being free of threaded interconnections.

2. The device of claim 1 where the screen consists of stainless steel wire cloth with a mesh between 10 and 50 threads per inch.

3. The device of claim 1 wherein said screen is circular and removably received in the body to seat against an upwardly facing interior shoulder thereof.

4. The device of claim 1 wherein the screen and body are integral.

* * * * *